United States Patent [19]
Seragnoli

[11] 3,948,115
[45] Apr. 6, 1976

[54] TRANSMISSION SYSTEM FOR A HIGH SPEED CIGARETTE PACKETING MACHINE

[75] Inventor: Enzo Seragnoli, Bologna, Italy

[73] Assignee: G. D. Societa per Azioni, Italy

[22] Filed: June 4, 1974

[21] Appl. No.: 476,306

[30] Foreign Application Priority Data
July 31, 1973  Italy.................................. 3456/73

[52] U.S. Cl................. 74/421 R; 53/154; 101/130; 131/25
[51] Int. Cl.² .. F16H 1/12; B65B 35/54; B41F 7/00; A24C 1/14
[58] Field of Search ................ 53/148, 154; 131/25; 74/421 R; 101/130

[56] References Cited
UNITED STATES PATENTS

| | | | |
|---|---|---|---|
| 1,834,355 | 12/1931 | Thornton | 101/130 |
| 2,110,216 | 3/1938 | Goedike | 101/130 |
| 2,977,733 | 4/1961 | Pearce | 53/154 |
| 3,265,183 | 8/1966 | Menge | 131/25 X |
| 3,398,750 | 8/1968 | Chamber et al. | 131/25 |

*Primary Examiner*—Leonard H. Gerin
*Attorney, Agent, or Firm*—Robert E. Burns; Emmanuel J. Lobato; Bruce L. Adams

[57] ABSTRACT

A transmission system for a high speed cigarette packeting machine of the type on which the arbor is made up of a number of movable parts, comprises a train of gears that mesh with one another, a motor for operating the gears in a continuous fashion, and a plurality of shafts constantly caused to rotate by the aforementioned gears. Operating mechanisms of the machine are distributed throughout a wrapping line which extends along a sinuous, undulated path. The mechanism are connected to the rotatable shafts, from a part of which some of them take intermittent motion through Geneva mechanisms, and from the other part of which the other mechanisms take reciprocating motion through eccentric transmission devices.

5 Claims, 9 Drawing Figures

TRANSMISSION SYSTEM FOR A HIGH SPEED CIGARETTE PACKETING MACHINE

BACKGROUND OF THE INVENTION

This invention relates to a transmission system for a high speed cigarette packeting machine.

DESCRIPTION OF THE PRIOR ART

Cigarette packeting machines are, as is known, substantially divided into two groups or classes.

The machines belonging to the first group or class, also called in the specific industry concerned machines of the conventional or fixed hollow arbor type, operate in such a way as to form the wrap around the fixed hollow arbor, also completing the bottom part and only leaving the other extremity on the opposite side to the base open, to act as a mouth for the insertion of the bath of cigarettes to be packeted, in the direction of the axis of the cigarettes which thus press against the bottom part of the wrap in order to free it from the fixed hollow arbor. As is known, machines of this type run at a speed such that it is possible to achieve a unit production of 120–140 packets per minute.

The machines belonging to the second group or class, known instead in the specific industry concerned, as machines of the type on which the arbor is made up of a number of movable parts and running at a speed such that it is possible to achieve something in the region of a unit production of 400 packets per minute, operate in such a way as to form the wrap directly around the batch of cigarettes which is made to move forward perpendicularly with respect to the axis of the cigarettes themselves. Between the batch of cigarettes and the wrapping or packeting material, a support pressure plate is inserted at the very point and at the very moment when a given fold is being made in the wrapping material and it is from this that the definition of the type on which the arbor is made up of a number of movable parts, takes its origin (see Italian Patent No. 803.352 in the name of the assignee hereof).

Within the framework of high speed packeting machines on which the arbor is made up of a number of movable parts, of the aforementioned type, transmission systems are known for driving the moving parts of the machine which are very complicated, see the above mentioned Patent in the name of the assignee hereof, whereby the output speed of the machine is set to the previously mentioned limit of 400 packets per minute. This is much below the speed, in actual practice, achievable when using the type of arbor made up of a number of movable parts.

SUMMARY OF THE INVENTION

Considering the possibility offered by this multiple movable part arbor system to overcome the forced concentration of masses in movement by distributing all along the wrapping line both the individual parts that go to make up the movable arbor and the individual wrapping units, and with the intention of exploiting the stated greater operating potential of this multiple movable part arbor system, the applicant designed a transmission system for operation at the higher speeds attainable with, and securing the advantages offered by continuously moving transmission systems, firstly eliminating all the transmission parts used to date on these machines which are subject to physical variations, for example, to lengthening and creating play, such as chains and belts etcetera, replacing them with direct continuous or positive transmission parts, for example, gears and, secondly, deriving for the individual working parts their intermittent unidirectional and reciprocating motions directly from the direct continuous and positive transmission.

In the transmission system forming the subject of the present invention for a high speed cigarette packeting machine of the type on which the arbor is made up of a number of movable parts, essential features are that it comprises: a train of gears that mesh with one another, a motor for operating the said gears in a continuous fashion, and a plurality of shafts constantly caused to rotate by the aforementioned gears for driving; the operating mechanisms of the machine which are distributed throughout a wrapping line. Said line extends along a sinuous, undulated path, defined by a plurality of wrapping wheels. These wheels, and operating units located on each wheel and cooperating with the same, are connected to said rotatable shafts, from a part of which some of the moved wheels and units take a unidirectional, intermittent motion through Geneva mechanisms and from the other part of which the other units take a reciprocating motion through eccentric transmission devices, particularly rotary cams.

BRIEF DESCRIPTION OF THE DRAWINGS

Further characteristics and advantages will emerge more clearly from the following detailed description of a preferred but not the sole form of embodiment for the transmission system according to the invention, illustrated purely as a non-limiting example on the accompanying drawings in which.

DESCRIPTION OF THE PREFERRED EMBODIMENT

Figure 1:
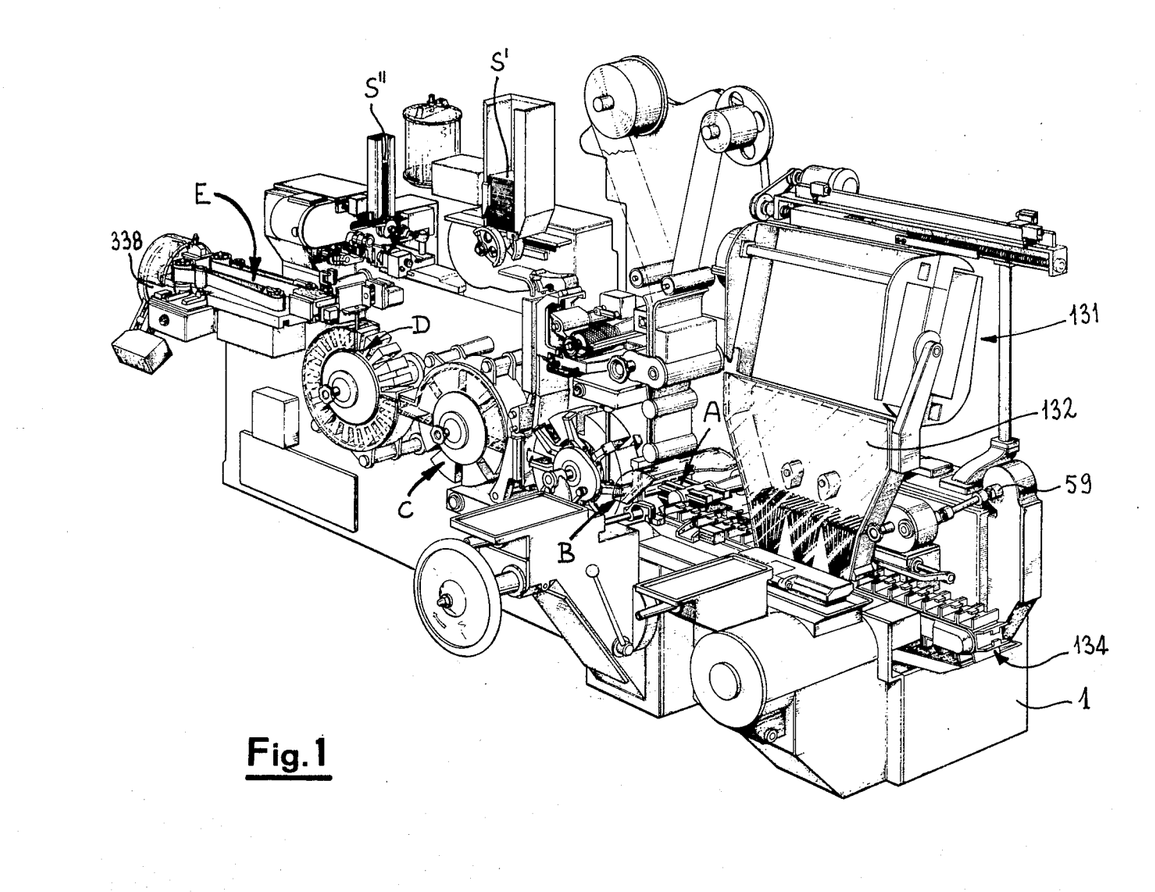
FIG. 1 shows diagrammatically, in a perspective view, a general drawing of the machine.
Figure 2:
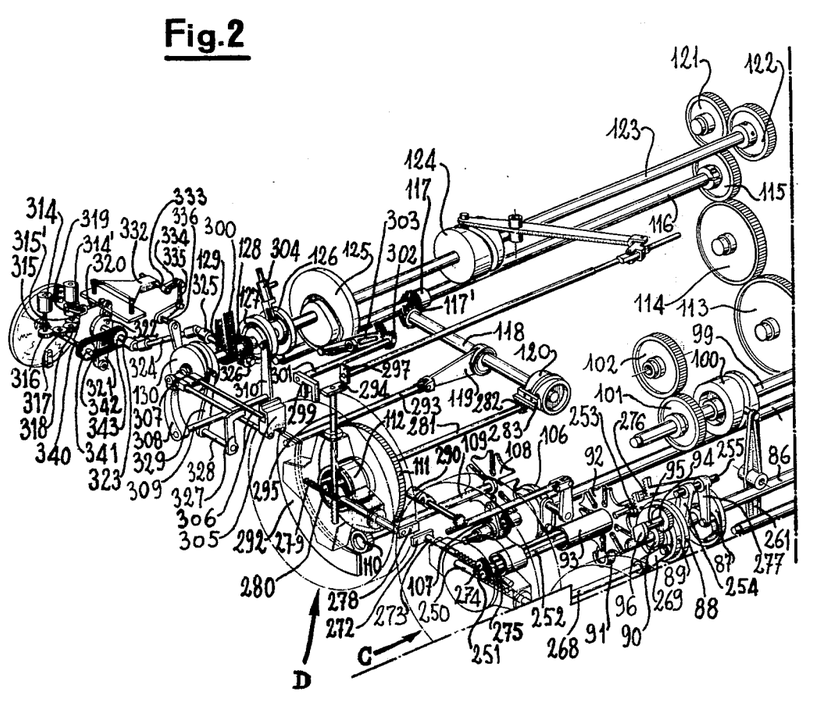
FIGS. 2, 2a and 2b show, also in perspective views, shows transmission diagrams for operating corresponding parts of the machine.
Figure 2A:
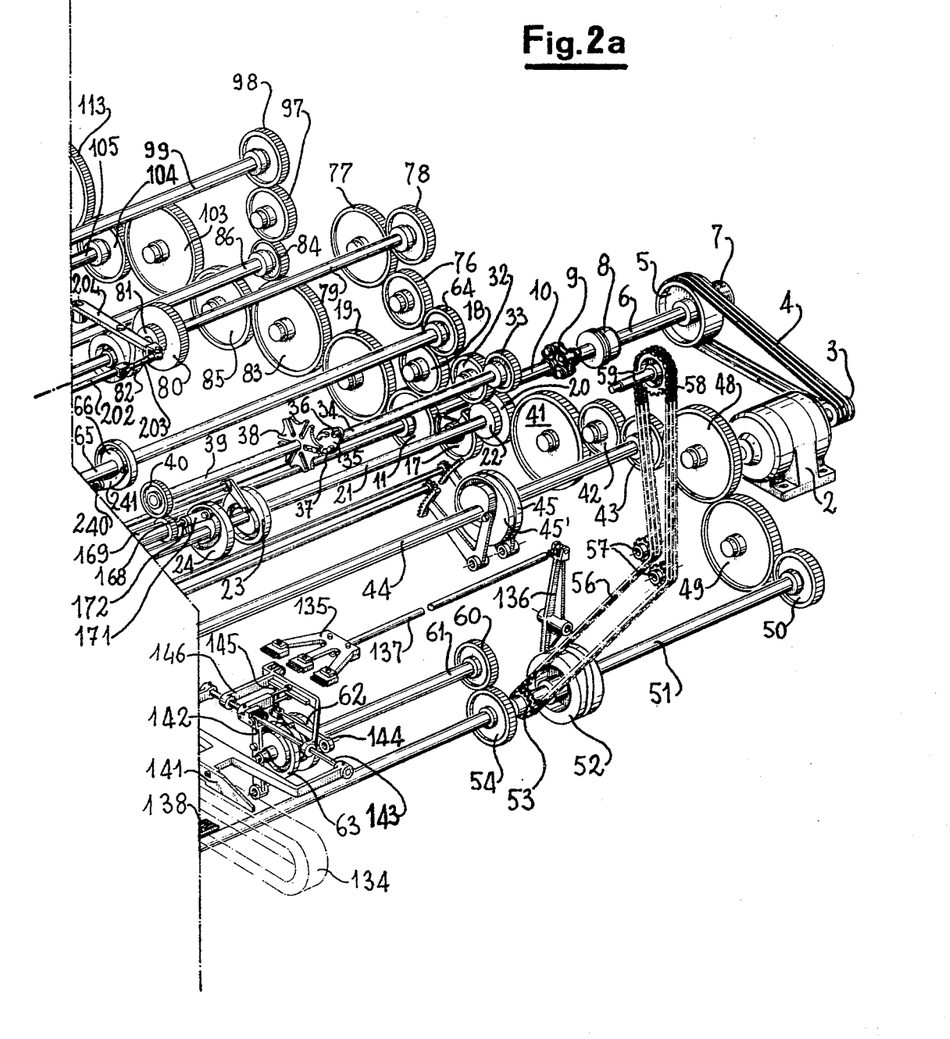

With reference to the above mentioned figures and, in particular, to FIGS. 1 and 2a at 1 there is the frame of the machine and at 2 an electric motor constituting the source for the prime movement.

The shaft of the motor 2 has keyed on to it a pulley 3 which, by means of the belts 4, carries in rotation a pulley 5 loosely mounted on a shaft 6 whose rotation it causes through a clutch 7, the rotation being unidirectional and continuous, as will be noted hereinafter.

Figure 4:
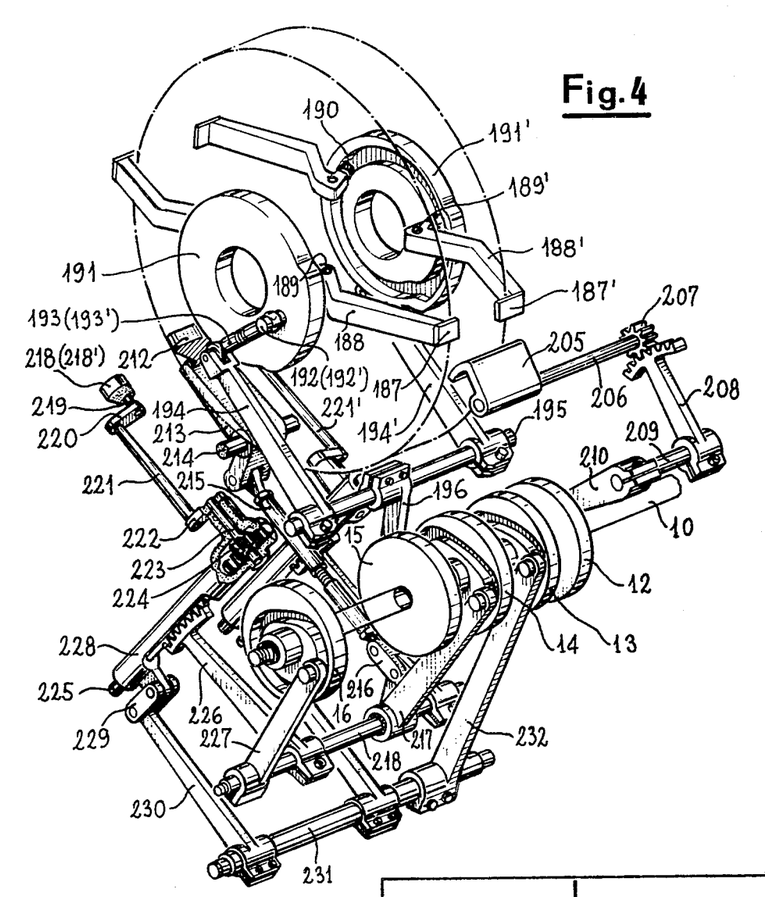
FIG. 4 shows, again in a perspective view and on an enlarged scale, a detail of the aforementioned transmission devices of FIG. 2b.

The shaft 6, on which a brake 8 is mounted, passes the rotary movement, through a flexible coupling 9, to a shaft 10 on which are fixedly mounted a gear 11 and, in succession, cams 12, 13; 14, 15 and 16 (see FIG. 4).

The gear 11 separately carries in rotation idle gearwheels 17, 18 and 19. Through a gear 20, the gearwheel 17 passes its rotatory motion on to a shaft 21 on which a gear 22 and the cams 23 and 24 are also keyed. The forward extremity of the shaft 21 (see FIG. 2b) also has rigidly mounted on it, in succession from the inside towards the outside of the frame 1, the gears 25 and 26, a cam 27 and, finally, a gear 28.

Figure 2B:
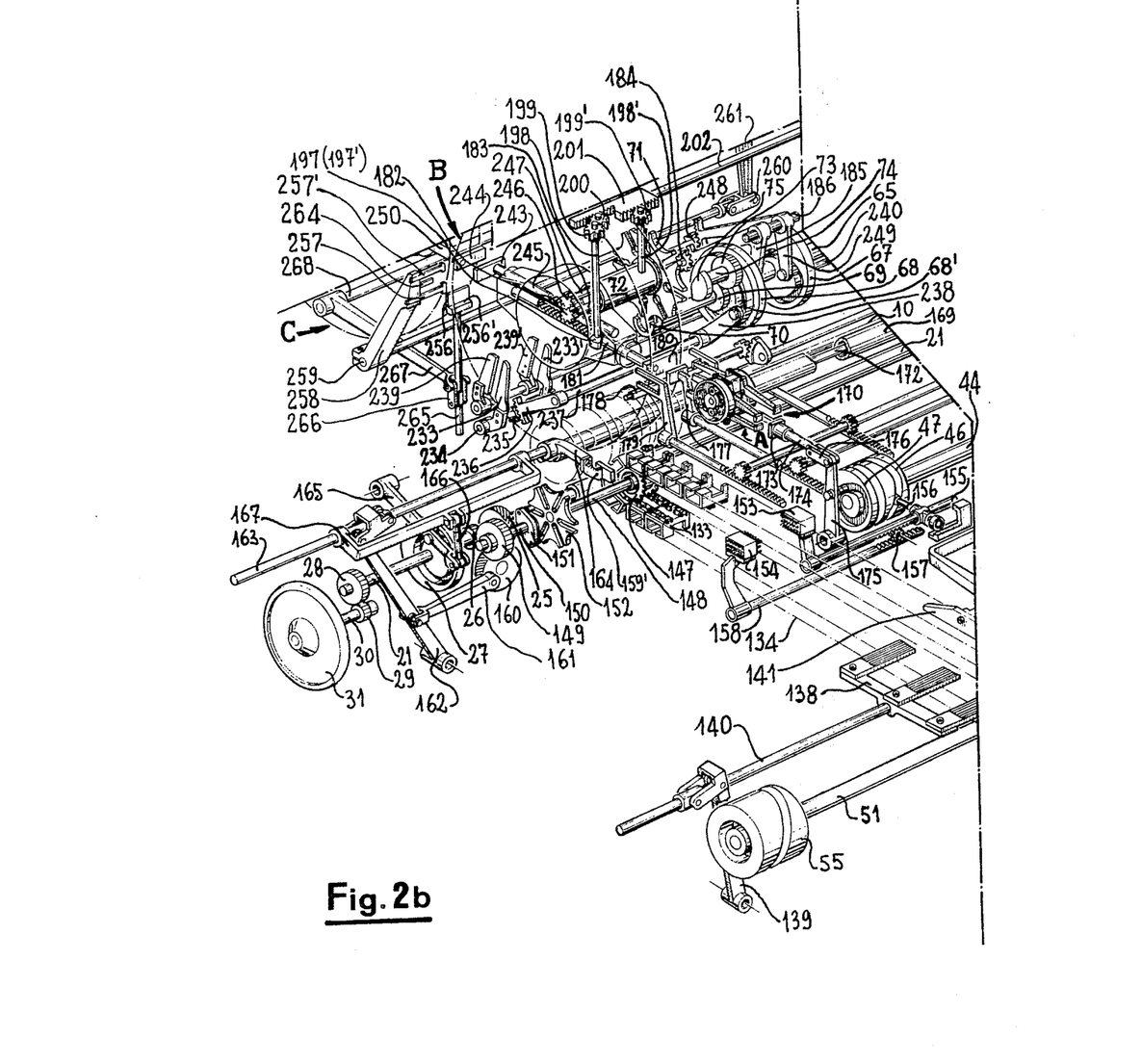
Figure 3:
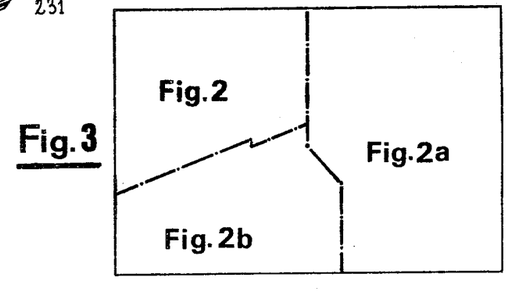
FIG. 3 shows a general schematic view of the parts of FIGS. 2, 2a, and 2b.

The gear 28 is mated with a gear 29 keyed on to a shaft 30 which, in turn, carries on the outside of the frame 1, a handwheel 31 for manually operating the complete transmission system.

Through an idle gearwheel 32 (FIG. 2a), the gear 22 carries in rotation a gear 33 keyed on to a shaft 34, on the opposite end of which is mounted a device 35 of a known type provided with two pins or loose needles 36 intercalated with two arcuate or centering members 37.

The pins 36 and the centering members 37 are destined to intermittently operate a six space Geneva mechanism 38 fixedly mounted on a shaft 39, the second extremity of which is integral with a gear 40, for operating cams in a first machine unit A, as noted hereinafter.

By means of the described linkage, the gear 40 completes two movements or steps each time the shaft 34 makes a full rotation.

The aforementioned gear 20 (see FIG. 2a) passes its uniform rotatory movement, through the idle gears 41 and 42, to a gear 43 integral with a shaft 44, to which are also keyed the cams 45, 45', 46 and 47.

In turn, the gear 43 carries in rotation, through a pair of idle gears 48 and 49, a gearwheel 50 integral with a shaft 51.

The shaft 51 also has rigidly mounted on it in succession, a cam 52, a sprocket wheel 53, a gear 54 and a cam 55.

The sprocket wheel 53 causes, through a chain 56 kept taut by the intemediate gears 57, the movement of a second gear 58 keyed on to a shaft 59. The gear 54, in turn, causes the rotation, through a gear 60, of a shaft 61 on which are rigidly mounted the cams 62 and 63.

The previously mentioned idle gear 18 carries in rotation, through a gear 64, a shaft 65 on which are keyed in succession, the four cams 66, 67, 68 and 68' and a gear 69 and has on its other extremity a device 70 of a known type, comprising a pin or idle needle and, in a diametrically opposed position to this, an arcuate or centering member.

The said device is destined to operate a second eight space Geneva mechanism 71 keyed on to a hollow shaft 72 on which is mounted, on the outside of the frame 1, a first wrapping wheel B (FIG. 1).

Through a gear 73, the above mentioned gear 69 turns a shaft 74 (FIG. 2b), one extremity of which is provided with an arcuate profile plate 75 whose function is to act as a second centering device, that is to say, a member for stabilizing the Geneva mechanism 71 in conformity with the principles outlined in Italian Patent No. 845.131.

The gear 64, in turn, passes a rotatory movement, through a pair of idle gearwheels 76 and 77, to a gear 78 integral with a shaft 79 on which the gears 80 and 81 and a cam 82 are fixedly mounted.

The previously mentioned gear 19, through an idle gearwheel 83, separately carries in rotation a gear 84 and a second idle gearwheel 85. The gear 84 is integral with a shaft 86 which has keyed on to it, the three cams 87, 88 and 89, a gear 90 and a device 91 of a type as already seen comprising a pin or loose needle and, in a diametrically opposed position to this, an arcuate member.

The device 91 is destined to operate a third, eight space Geneva mechanism 92 carried by a hollow shaft 93 on which is mounted, outside the frame 1, a second wrapping wheel C (FIG. 2).

The above mentioned gear 90, through a gear 94, turns a shaft 95, the other extremity of which is provided with an arcuate profile plate 96 whose function is to act as a second centering device, that is to say, a member for stabilizing the third Geneva mechanism 92 for driving wheel or unit C. Furthermore, the gear 84 has the task of passing its rotatory motion, through a gearwheel 97, to a gear 98 integral with a shaft 99 which carries rigidly mounted on it, a cam 100 and a gear 101 which meshes with a gear 102.

The aforementioned idle gearwheel 85, through an idle gearwheel 103, carries in rotation a gear 104 integral with one extremity of a shaft 105 on which a cam 106 is rigidly mounted, the other extremity being provided with a device 107 of a known type for operating, in an intermittent fashion, a fourth Geneva mechanism 108 carried by a shaft 109. The said shaft 109 is integral with a gear 110 meshing with a gearwheel 111 to which it passes on its intermittent rotatory motion to drive wheel or unit D.

The gearwheel 111 is integral with a sleeve on which is also mounted, on the outside of the frame 1, the third wrapping wheel D.

The driving and driven shafts 6,10,21,30,34,39 etc. are parallel to one another. By means of the Geneva wheels, parallel shafts 39, 93, 109 etc. are driven intermittently by the continuously rotating drive system 2,3,6 etc., always in the same rotary direction for each shaft.

The rotatory movement of the gear 104 is also passed on, by means of two idle gearwheels 113 and 114, to a gear 115 integral with a shaft 116. Through a crown wheel 117 and a pinion 117', the shaft 116 carries in rotation a shaft 118 on which are mounted a tapered connecting rod 119 and a cam 120.

Finally, through a gearwheel 121, the rotatory movement of the gear 115 is passed on to a gear 122 integral with a shaft 123 on which are fixedly mounted in succession, four cams 124, 125, 126 and 127, a helical gear 128, a sprocket wheel 129 and a fifth cam 130.

Up to now a description has been given of the fundamental mechanism constituting the sources of intermittent, unidirectional, rotary prime movements for the wrapping units A to D of the machine according to the invention and now a detailed description will be given of the various cigarette transfer and wrapping stages A to D and of the reciprocatingly movable mechanical assemblies provided to carry out the said operations.

As regards certain items of equipment of a known type which although forming the subject of Patent Applications or Patents in the name of the assignee hereof, also constitute an integral part of the said machine, reference alone is made to them in this text without going into any details.

On FIG. 1 there is an assembly 131 comprising a mechanism with a rotatable head destined to receive given quantities of cigarettes previously grouped together in containers and to discharge these cigarettes into an infeed hopper 132 of the packeting machine in the way described in Italian Patent No. 779.386 in the name of the assignee hereof.

With the aid of a system of agitators, as described in Italian Patent Nos. 803.345 and 750.677 in the name of the assignees hereof, moved by the shaft 59, the multichannel hopper 132 supplies superposed layers of cigarettes, side by side, to form complete batches G of cigarettes, in pockets 133 of an intermittently advancing belt or chain conveyor 134 of the type described in Italian Patent No. 803.345 in the name of the assignees hereof.

At 135 there is a cigarette regulating device (see FIG. 2a) which has a cyclic effect on each of the channels in the hopper 132, which in the case under consideration are three, in the manner described in Italian Pat. No. 921.005 in the name of the assignees hereof.

The device 135 takes its reciprocating movement from the previously mentioned cam 52 through a two armed lever 136 provided with a loose pin (not illustrated) and a shaft 137.

At 138 (FIG. 2b) there is a means for ejecting the layers of cigarettes from the hopper 132 and for transferring them to a conveyor 134 in the way as outlined in Italian Patent No. 803.345 in the name of the assignees hereof.

The ejecting means 138 takes its reciprocating movement from the previously mentioned, rotating cam 55 through a lever 139 fitted with a loose pin and mechanically linked to a shaft 140 with which the aforementioned ejection means 138 is integral.

Finally, at 141 there is a device for stabilizing the batches of cigarettes as they are being formed layer by layer in the pockets 133 of the conveyor 134 in the way described in Italian Patent No. 882.138 in the name of the assignee hereof.

In conformity with the statements made in the last mentioned Patent, the device 141 is given a compound movement derived from the previously mentioned rotating cams 62 and 63. To be more precise, a reciprocating movement in the direction in which the conveyor means 134 moves is provided by the cam 63 through a lever 142 fitted with a loose pin and mechanically linked to a shaft 143, while an additional reciprocating, or oscillating to-and-fro moement with respect to the batches of cigarettes being formed is given by the cam 62 to the device 141 through a lever 144 fitted with a loose pin, a link rod 14ɔ, a lever 146 and again through the shaft 143 which, in this case, acts as a hinge.

The complete batches G of cigarettes, formed by the superposition of successive layers in the inside of the pockets 133 with which the conveyor 134 which moves intermittently or in steps is provided, are thus sent on towards the wrapping mechanism of the machine.

The conveyor 134 closes on to a gear 147 integral with a shaft 148. The intermittent rotatory movement the shaft 148 is given comes from the previously mentioned gear 26 through a gear 149 keyed on to a shaft 150 which is provided with a device 151 of a well known type for operating a fifth, six space Geneva mechanism 152 carried by the shaft 148 for operating conveyor 134 in unit A.

On both sides of the path along which the conveyor 134 travels further check devices are provided and these are given synchronous to-and-fro movements in the direction of the axis of the cigarettes. The devices, 153 and 154, respectively, check that the batches of cigarettes G are complete, that the arrangement of the cigarettes in each batch is as it should be and that the tips of the individual cigarettes are sound, as outlined in Italian Patent No. 803.345 in the name of the asignee hereof.

The check device 153, at the rear when viewed from the position shown in FIG. 2b, is integral with a shaft 155 provided with a rack and, in turn, the shaft 155 is integral with a shaft 156 perpendicular thereto. The latter is provided with a pin which slides in the race in the cam 46 from which the device 153 derives its reciprocating motion.

The reciprocating movement of the front check device 154 extends from the aforementioned rack through an idle gear 157 and a shaft 158 provided with a rack and one end of which is integral with the device 154.

After the checking operation that has just been described is over, the batches G of cigarettes contained in the pockets 133 arrive at a transfer station whence they are transferred, one batch each time the conveyor 134 pauses, with a direct movement in the direction of the axis of the cigarettes, to the compartment in an intermittently undirectionally rotatable transfer head or unit A by means of a pusher 159 moved in a reciprocatng fashion, as, for example, described in Italian Patent No. 803.345 in the name of the assignee hereof.

In order to avoid interfering with the subsequent compartments 133 in the conveyor 134 at the time a fresh batch G is being transferred into the head A, once the pusher 159 has completed the transfer operation, it is raised with respect to the plane of the conveyor 134 and then returned to its former position.

The pusher 159 takes its axial reciprocating motion from the previously mentioned gear 25 through a gear 160, a connecting rod 161, a lever 162 connected to a shaft 163 and an arm 164 to which the aforementioned pusher 159 is anchored.

As regards the reciprocating movement, this is given to the pusher 159 by the previously mentioned rotating cam 27 through a lever 165 fitted with a loose pin, a link rod 166 and a rod 167 provided with two arms integral with the above mentioned shaft 163.

The rotatable head A destined to receive the batch G of cigarettes is of the type described in patent application Ser. No. 423,222 filed Dec. 10, 1973 by the applicant hereof.

In accordance with the detailed description given in that patent application, the head A is given an intermittent unidirectional rotating movement around its axis by gear 40 through a gear 168 and a hollow shaft 169 with which it is integral. The head A is, furthermore, provided with two identical diametrically opposed compartments which hold the batches G of cigarettes. Each compartment is fitted with two pairs of jaws 170 opened and closed by the previously mentioned cam 24 through a link rod 171 provided with a loose pin and a shaft 172.

Again, as described in the aforementioned Patent Application, at the time the batch G of cigarettes is transferred into the right-hand compartment of the head A, a plate 173 comes into operation in order to serve as a retaining wall for the cigarettes once they are inside the compartment, up until the jaws 170 close.

The plate 173, mounted on a shaft 174, is given a reciprocating motion perpendicularly to the axis of the cigarettes and this is derived from the previously mentioned cam 47 through a lever 175 fitted with a pin and a link rod 176 connected to the shaft 174.

Following a rotation through 180° around its axis on the part of the rotatable head A, in the direction of the arrow f' the batch G of cigarettes arrives in a rest position diametrically opposed to that in which it was formerly, in contact with a vertical plane where the cuttings S of lined foil destined for the inner wrap are supplied.

The cuttings S of lined foil, prior to arriving at the said station where they are destined to be used for the inner wrap, are cut off a reel by rollers fitted with cutting edges and are subjected, for example, to the action of rollers provided with scoring edges which prepare the material for folding along predetermined lines in the way described for example, in Italian Patent No. 803.349 in the name of the assignees hereof.

Figure 5:
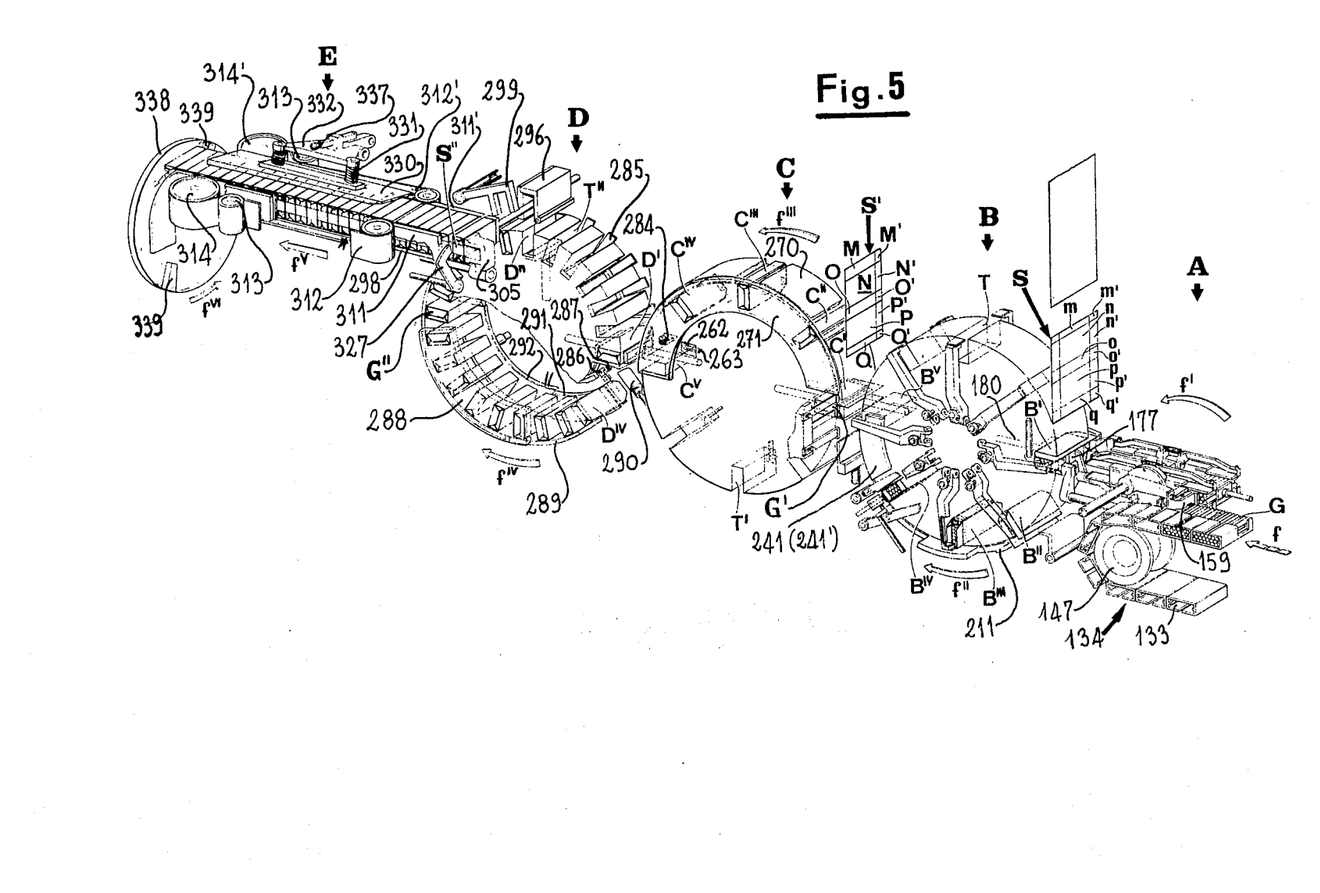
FIG. 5 shows, once more in a perspective view and in diagrammatic form, the succession of the various wrapping operations.
Figure 6:
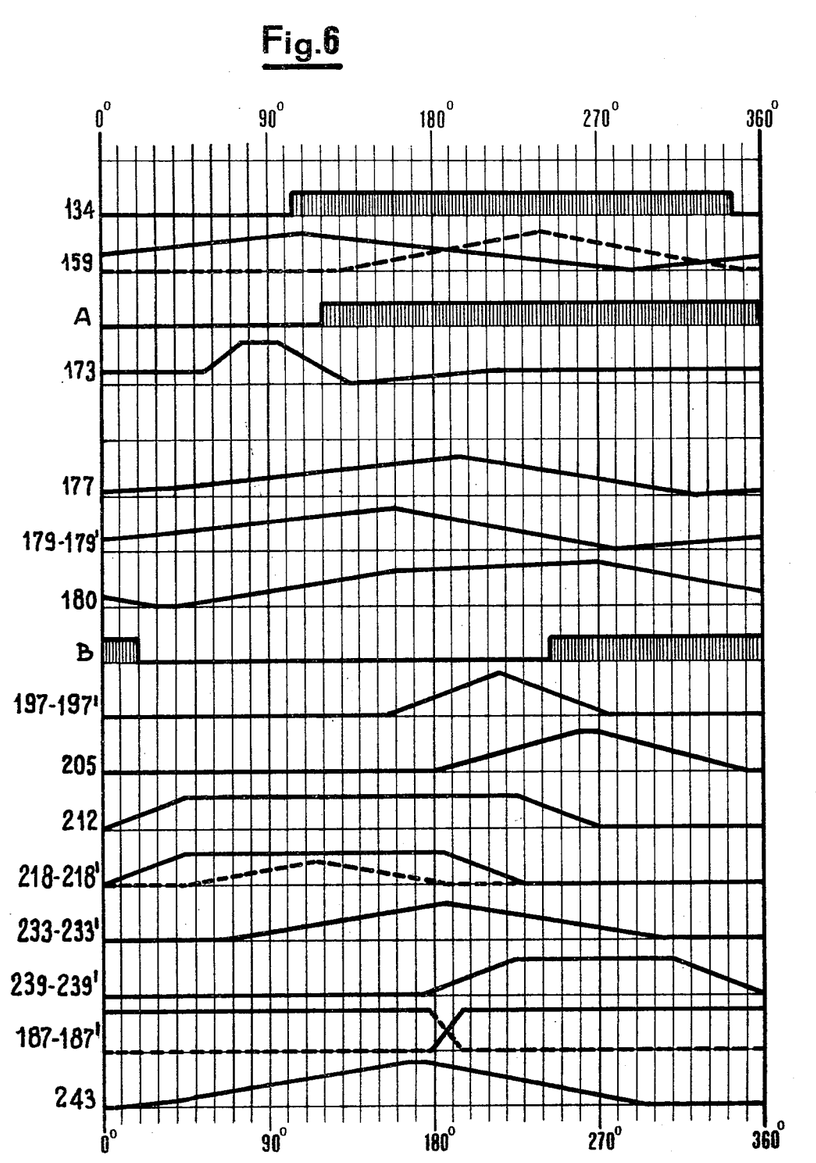
FIGS. 6 and 6a show time-phase graphs for the fundamental units based on one operating cycle of the said machine.
Figure 6A:
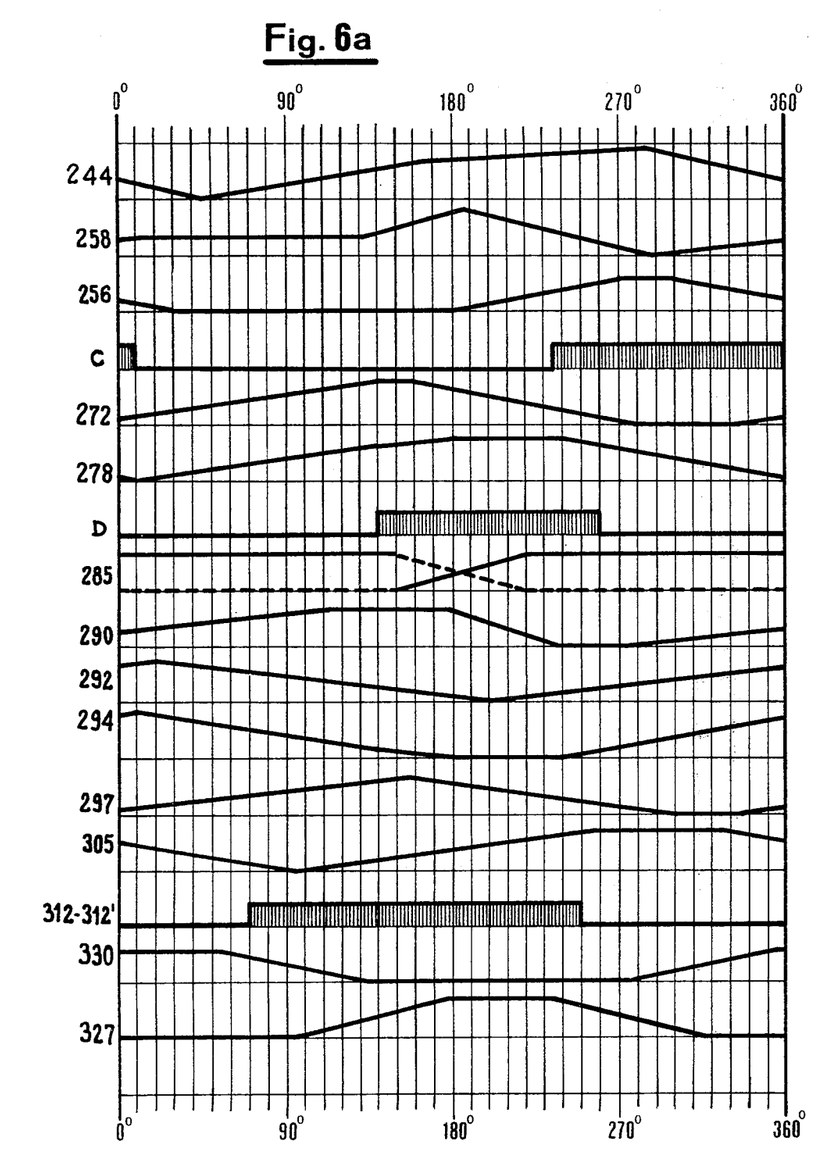

The patent also describes means for supplying the lined foil, neither described herein nor shown in the FIGS. 2 and 5 since they are not a part of the present invention. They are operated by the previously mentioned gear 80 (see FIG. 2a). The patent also describes cooperating rollers fitted with cutting edges and scoring edges, respectively, which are also omitted here; they take their movement from the previously mentioned gear 81 (see again FIG. 2a).

Thus when the cuttings S arrive at the above mentioned utilization station, they are divided by the folding lines from top to bottom into five rectangular panels or, to be more precise, into an upper panel $m$, called the reinforcing panel, followed by a panel $n$, by a panel $o$, by a panel $p$ and, finally, by a panel $q$, the latter two being identical to the panels $n$ and $o$, respectively.

Each of the panels $m$, $n$, $o$, $p$ and $q$ is provided with a pair of lateral tabs $m'$, $n'$, $o'$, $p'$ and $q'$ separated from the panels and from one another by other folding lines.

At this juncture, the batch G of cigarettes is, now that the transfer operations briefly described above have been completed, at the entrance point to the actual packeting line of the new machine. This packeting line consists of the plurality of stations marked B, C, D and E, respectively, on FIG. 5.

Batch G moves arcuately and undulatingly about the stations B, C and D, constituted by wheels rotatable intermittently unidirectionally around shafts horizontal with that of the head A and parallel thereto. The wheels are provided with radial peripheric compartments, while the station E, that is to say, the exit station, is constituted by a belt conveyor which moves unidirectionally in straight-lined steps, driven by another parallel shaft. Still other parallel shafts drive mechanism cooperating with units A to E.

The transfer of the batch G of cigarettes together with a cutting S of lined foil to the wheel B occurs once the jaws 170 have opened, through a pusher 177, the movement of which is perpendicular with respect to the axis of the cigarettes; this axis being kept parallel to the shafts, and the pusher 177 being one of the cooperating mechanisms.

While pusher 177 moves, the batch G of cigarettes is supported by a movable bar 178, and any axial sliding action on the part of the cigarettes is prevented by the lateral plates 179 and 179'.

As described in detail in the aforementioned patent application Ser. No. 423,222, the pusher 177 and the lateral plates 179 and 179' take their reciprocating movement from the previously mentioned rotating cam 45' and 45, respectively, while the bar 178 derives its reciprocating motion from the previously mentioned rotating cam 23.

A counter pusher 180 operates in conjunction with the pusher 177 and this, provided with a reciprocating motion and located at a point corresponding to the wrapping wheel B, approaches the cutting S of lined foil from the rear. It causes the foil panel $o$ to attach itself to the forward side, in the infeed direction, of the batch G of cigarettes and then, in its return travel, accompanies the batch G which is subjected to the action of the pusher 177 towards the inside of a compartment T in the wheel B while the wheel is at a standstill. The counter-pusher 180 is mounted on a horizontal rod 181, the other end of which has a tooth rack with which to mesh with a gearwheel 182 keyed on to one end of a horizontal shaft 183 inside the previously mentioned hollow shaft 72.

The other extremity of the shaft 183 carries fixedly mounted on it a gearwheel 184 which meshes with a sector gear with which the extremity of one arm of a two armed lever 185 pivoted to a shaft 186 supported by the frame 1 of the machine is provided. The free end of the other arm of lever 185 has pivoted to it a loose pin the purpose of which is to engage with the race in the previously mentioned operating cam 68.

The intermittently counter clockwise rotating wheel B (see the arrow f'') is provided with eight radial compartments T open on the two opposite sides, able to hold parallelepiped shapes, placed at 45° one from the other each compartment halts, because of the way in which the wheel B is connected to the eight space Geneva mechanism 71, in line with the path of the pusher 177 at a position indicated as B' (see FIG. 5).

Pushed by the pusher 177 and accompanied by the counter-pusher 180 and by the two lateral plates 179 and 179', the batch G of cigarettes is then inserted into the compartment T in such a way that the two panels $n$ and $p$ of the cutting S hit the entrance corners of the compartment and are forced to progressively make a U-fold on the upper layer and on the lower layer of the batch G of cigarettes.

Once the batch G has reached the bottom of the compartment T, the counter-pusher 180 still continues its travel moving slightly away from the panel $o$, while the pusher 177, having performed its task, releases the cigarettes and is free to commence its return travel towards the rotatable head A.

In order to prevent the cigarettes of batch G from coming out of the compartment T when, as just stated, the retaining action of the pusher 177 ceases, two rectangular plates 187 and 187' which up until this stage have been positioned away from the entrance aperture of the compartment T, move together and block the furthermost area of the rear side of the batch G (see FIG. 4), with respect to the infeed direction.

Plates 187 and 187' whose functions will be more fully seen in the continuation of the description are integral with the extremities of arms 188 and 188', respectively, oscillating in the same radial plane and pivoted at 189 and 189', respectively, in a symmetrical fashion on the two opposite faces of the wheel B.

These arms with which each compartment T is fitted, thus form two symmetrical systems with respect to the wheel B.

In the proximity of pivots 189 and 189', the arms 188 and 188' are fitted with loose pins 190, the task of which is to slide in the race of the cam 191 and of the cam 191', respectively, both coaxial with the wheel B.

The races in cams 191 and 191' are so disposed that the arms 188 and 188' on the compartment T under examination and at a standstill in the position B' come towards each other immediately the wheel B driven by the Geneva mechanism 71 commences moving towards a second position B''.

As stated above, however, the operation of the two plates 187 and 187' is necessary earlier on, that is to say, at the moment when the pusher 177 releases its hold on the batch G and the wheel B is, therefore, still at a standstill.

For this particular reason the operation of the two arms 188 and 188' is advanced and this is done by rotating once the cams 191 and 191' while the pins 190 stay still.

This operation is made possible by a mechanism consisting of pins 192 and 192' fixed eccentrically on the cams 191 and 191', connected through the link rods 193 and 193', respectively, to the end of a lever 194 and to the end of a lever 194' integral with the two opposite ends of a common shaft 195.

Shaft 195 has rigidly fixed to it at an intermediate point one extremity of a lever 196, the other end of which (not shown in FIG. 4) is fitted with a loose pin which engages in the race in the previously mentioned cam 15 keyed to the shaft 10.

After the positioning of the two plates 187 and 187' whereby the batch G and the cutting S are prevented from moving, further operations take place inside the compartment T which is still at a standstill in the position B' in order to wrap the batch G in the cutting S of lined foil, that is to say, first of all, the tabs o' protruding from the two faces of the wheel B are folded against the two ends of the batch G of cigarettes. This task is performed by the folders 197 and 197' which are in the form of blocks oscillating in a horizontal plane, and each having an arcuate part of its profile which engages, in synchronization one with the other, with the two tabs o' flattening them at right angles against the opposite ends of the batch G.

Folder 197 is integral with a shaft 198, whereas folder 197' is integral with a shaft 198'. The upper extremity of the said shaft 198, which is vertical, carries rigidly mounted on it a gear 199, whilst the upper extremity of the said shaft 198', also vertical, has rigidly mounted on it a gear 199'.

The gear 199 takes its movement through an idle gear 200 from a rack with which a plate 201 is provided, whilst the gear 199' meshes directly with a second rack on the aforementioned plate 201 which is integral with one end of a horizontal rod 202. The other extremity of the aforementioned rod 202 is fastened, through an articulation 203, to one end of a lever 204 pivoted to a fixed support carried by the frame 1 of the machine. At an intermediate point, lever 204 is provided with a loose pin destined to slide in the race of the previously mentioned cam 82.

Once the operations of these mechanisms of wheel B have been carried out, the wheel B commences the next step of its clockwise rotation thereby consequently transferring the compartment T under consideration towards the subsequent or second position B'' placed at 45° with respect to the considered entry position B'.

During the following period of immobility of the wheel B, the reinforcing panel m lying on a radial plane of the wheel B is folded against the two plates 187 and 187' which are still closed against the rear side of the batch G.

This is done by a spade shaped folder 205 oscillating on a path tangential to the cylindrical surface of the wheel B, which engages on edge with the panel m and flattens it against the side of the batch G. The folder 205 is fixed to a horizontal shaft 206 constituting its axis of rotation, the other end of which has keyed to it a gear 207 destined to mesh with a sector gear with which one extremity of a lever 208 pivoted to a horizontal shaft 209 is provided. The other end of said shaft is fastened to a second layer 210 fitted with a loose pin (not illustrated on FIG. 4), the purpose of which is to engage in the race of the previously mentioned cam 12. It should be noted that while this operation is being performed, the plates 187 and 187' serve to buffer the action of the folder 205, thereby protecting the cigarettes against any possible damage and allowing, furthermore, a wrap with perfect corners to be made.

After this there is a further rotary step on the part of the wheel B to transfer the compartment under consideration to a third position B'' placed at 90° with respect to the entry position B'. While this displacement is being effected and prior to the already folded panel m being released by the folder 205 in its return oscillation, the panel q is flattened on to the said panel m. In this case too, the plates 187 and 187' fulfil the tasks just described for the folding of the panel m.

This latter operation on the panel q is performed by a fixed folder 211 constituted by a carinated guide coaxial to the wheel B, the extension of which delimits the cylindrical surface of the wheel as far as the ejection station for the batch G.

The compartment T thus pauses in the position B''' and subsequently during the transfer towards a position $B^{IV}$ the arms 188 and 188' open, operated, as previously stated, by the cams 191 and 191' and, consequently, the plates 187 and 187' are withdrawn from beneath the already folded panels m and q.

Any displacement on the part of the batch G of cigarettes partially wrapped in the cutting S in the compartment T under consideration is now prevented by the presence of the guide 211.

The considered compartment T then arrives in the position $B^{IV}$ at a point where the guide 211 has an interruption in it for the insertion of a presser block 212 which is moved until the superposed panels m and q are pressed tightly up against it. This is done to render easier the further wrapping operations carried out during the pause in the aforementioned position $B^{IV}$.

The presser block 212, moved in an oscillating fashion, is mounted on one arm of a two armed lever 213 pivoted at 214 to a fixed support, the other arm, shaped like a fork, being pivoted to one extremity of a rod 215. The other extremity of rod 215 is, in turn, fastened through a link rod 216 to a lever 217 pivoted to a shaft 218.

The free end of lever 217 is fitted with a loose pin which slides in the race in the previously mentioned cam 14.

After the operation of the presser block 212 and in this same position $B^{IV}$, the tabs q' and m' which are already superposed on each other since they are the ends of the panels q and m, respectively, are folded against the opposite ends of the batch G.

This task is performed by two folders 218 and 218' which are given a compound reciprocating-oscillating movement and which, with their operating devices, constitute two symmetrical ensembles with respect to the wheel B. Since both folder assemblies are identical, the description given below of the folder 218, that is to say, the front folder when looking at FIG. 4, as also the way in which it operates, can be taken as being exactly the same for the folder 218' too.

The folder 218 is integral through a pin 219 with a link rod 220 fixed to one extremity of a rod 221, the other extremity of which has keyed to it a link rod 222.

This link rod is in turn, integral through a shaft 223 with a gear 224 which meshes with a rack with which the upper extremity of a rod 225 is provided.

The rod 225 has, lower down, a second rack which meshes with a sector gear carried on one extremity of a lever 226 rigidly pivoted to a shaft 218. This shaft, in turn, takes its movement from a lever 227 integral with it and provided with a loose pin which slides in the race of the previously mentioned operating cam 16.

The aforementioned shaft 223 which constitutes the axis of rotation for the folder 218 is sustained together with the rod 225 by a movable support 228, in turn sustained by a fixed support, not shown in FIG. 4, on which it slides in the direction of the axis of the rod 225. The support 228 is movable since it is connected through a link rod 229 to a lever 230 rigidly pivoted to a shaft 231. The movement of shaft 231 is through a lever 232 fixed to it and provided with a loose pin that slides in the race in the previously mentioned operating cam 13.

On account of the foregoing, the lever 230 initially supplies the support and then subsequently the complete folder device with a rigid approach movement with respect to the wrapping wheel B.

Then when the lever 226 fitted with a sector gear moves axially, the rod 225 carries in rotation around the axis of the shaft 223, the folder 218 and this engages along its path with the tabs $q'$ and $m'$ and flattens them on to the forward end of the batch G.

Upon completion of the folding operation, the folder 218 oscillates in the opposite direction and consequently releases the foil wrap and this is followed by the wheel B, still operated by the lever 230, moving away.

Following the said operation and again during the said period of immobility, the operation takes place of folding the tabs $n'$ of the panel $n$ protruding from the two sides of the wheel B and lying on one of its radial planes. Two oscillating folders 233 and 233' attend to this and during their outward travel they engage on edge with the tabs $n'$ and fold them down on to the two opposite ends of the batch G in order to lock the previously folded tabs $q'$ and $m'$ in position.

The said folders 233 and 233' are integral with one and the same shaft 234 on which is also carried a gear 235 which meshes with a sector gear on one end of a lever 236 integral with a shaft 237. Also integral with the said shaft is a second lever 238 fitted with a loose pin that slides in the race of the previously mentioned operating cam 68'.

To conclude, again in the same position $B^{IV}$, the tabs $p'$ of the panel $p$ which are at the front with respect to the direction in which the wheel B moves forward, are folded by the two folders 239 and 239' which oscillate and exactly as just seen for the folders 233 and 233' engage on edge in their outward oscillation with the said tabs $p'$ and flatten them down on to the two opposite ends in order to complete the wrapping of the batch G of cigarettes in the cutting S of lined foil. The said folders 239 and 239' are pivoted to the same shaft 240 which constitutes their axis of rotation and with which, inside the frame 1 of the machine, a lever 241 is integral. The lever 241 is operated by a pin sliding in the race of the previously mentioned cam 66.

At this juncture, having finished acting as a retaining and blocking device for the batch G of cigarettes and for the wrap S being formed in the inside of the compartment T, the presser block 212 commences its return oscillation and separates itself from the panels $m$ and $q$, while the wheel B resumes its unidirectional, intermittent rotation towards an ejection position $B^V$.

During this rotation, the folds in the tabs $b'$ are improved and are flattened down on to the tabs $n'$ again by the two folders 239 and 239' which, in this second phase, operate as fixed folders. Then the packet indicated as G' and consisting of the batch G of cigarettes completely wrapped in the cutting S of lined foil, continues its transfer travel held in its correct position inside the compartment T by fixed guides, that is to say, by the previously considered coaxial guide 211 which after the interruption in the position $B^{IV}$ again delimitates the cylindrical surface of the wheel B and by the two lateral guides 242 and 242' shaped in the form of circular rims attached to the two opposite sides of the wheel B up to the ejection position for the packet G'.

In the position $B^V$ which is diametrically opposed to the entry position B', the ejection of the packet G' from the wheel B takes place by means of a pusher 243 which at this time performs an outward movement as part of its reciprocating movements in conjunction with a counter-pusher 244 for the transfer of the said packet G' from the compartment T to a compartment T' in the second wrapping wheel C together with a cutting of paper S' destined to become the label or outer wrap for the finished packet.

Exactly as seen for the counter-pusher 180, the pusher 243 is located at a point corresponding to where the wrapping wheel B is positioned, is placed in horizontal alignment with the compartment T at a standstill in the ejection position $B^V$ and is given an outward and return reciprocating motion. The said pusher 243 is mounted on a horizontal rod 245 fitted with a rack to mesh with a gearwheel 246 keyed on to one extremity of a horizontal shaft 247 inside the hollow shaft 72. The other extremity of the said shaft 247 carries rigidly mounted on it a second gearwheel 248 which meshes with a sector gear on the end of one arm of a two armed lever 249 pivoted to the shaft 186 carried by the frame of the machine.

Pivoted to the free end of the other arm of the said lever 249 is a loose pin which engages in the race of the previously mentioned operating cam 67 for moving pusher 243.

The counter-pusher 244 is, instead, positioned by the wrapping head C and in perfect keeping with what has been said in respect of the pusher 243, it is placed in horizontal alignment with the compartment T' in the wheel C at a standstill in the position C', known as the entry position and is provided with an outward and return reciprocating motion. The said counter-pusher 244 is mounted on a horizontal rod 250, the other end of which has a rack to mesh with a gearwheel 251 rigidly mounted on one extremity of a horizontal shaft 252 inside the hollow shaft 93.

A second gearwheel 253 is keyed to the other end of the said shaft 252 and this meshes with a sector gear on the end of one arm of a two armed lever 254 pivoted to a shaft 255.

The free extremity of the other arm of the said lever has pivoted to it a loose pin which engages in the race of the previously mentioned operating cam 88 for moving counter pusher 244.

The cuttings S' destined, as is known, to cover the sides and the bottom or rear end when viewing the packet G' in FIG. 5 consist of rectangular pieces of a paper material. These are either taken by means of a cutting operation from a continuous reel or from a pile and are supplied, through means operated by the gear 102 and after a gluing operation (for example, in accordance with Italian Patent No. 834.014, assigned to the name of the same assignees as herein), one at a time in synchronization with the forward movement of the pusher 243 along a vertical plane close to the cylindrical surface of the wrapping head C and in front of the ejection position $B^V$ for expelling the packet G' from the wheel B.

In order to simplify the following description of the various wrapping phases and to keep to what has been seen already for the cutting S, the cutting S' has been subdivided up by means of theoretical folding lines marked with dots and dashes into the various panels destined to constitute the sides of the outer wrap.

From top to bottom, the capital letters M, N, O, P and Q indicate the various panels, while in the same order, M', N', O', P' and Q' indicate the tabs for said panels which, as will be seen in due course, are intended to cover the base of the packet G'.

The cutting S' arrives at the utilization station, locked at the bottom by a horizontal surface stop 256', machined in the body of a folder 256, the exact purpose of which will be seen in due course.

Still in the said utilization station B, two horizontal rods 257 and 257' operate on the plane on which the cuttings are supplied and both are provided with an axial reciprocating motion.

Acting in conjunction with a fixed vertical member (not shown in FIGS. 2b or 5), rods 257,257' have the task of locking the cutting S' horizontally at two different levels and of correcting any vertical axis displacement that may have occurred during the infeed operation. The rods are fixed to one and the same arm 258 integral with a horizontal shaft 259 sliding axially on fixed supports and connected through a link 260 to a two armed lever 261 pivoted to a fixed support. The other arm of lever 261 carries a loose pin which engages in the race of the operating cam 100.

As stated, in the course of its outward travel, the counter-pusher 244 intercepts the cutting S' which is at a standstill in the above mentioned position and causes the panel 0 to become tightly attached to the front side, in the infeed direction, of the packet G'.

At this point, the pusher 243 and the counter-pusher 244, the latter serving as a contrast member, commence in a synchronous fashion their travel in order to transfer the packet G' from the compartment T of the wrapping wheel B to the inside of an identical compartment T' in the wrapping wheel C.

The wheel C rotates in a counter clockwise direction (see the arrow f'') and is provided with eight radical compartments T', placed a 45° from one another, open at the two opposite ends and able to contain parallelepiped shapes. On account of the way in which the wheel C is connected to the eight space Geneva mechanism 92, the said compartments come into rest positions in alignment, one after the other, with the path along which the pusher 243 travels, in a position shown as C' (see FIGS. 2b and 5).

At the time the packet G' is inserted in the compartment T', the two panels N and P of the cutting S' hit against the entrance corners and are forced to progressively fold on to the upper and lower sides of the packet G'.

Furthermore, while the packet G' is sliding towards the bottom of the said compartment T', the tab O' of the panel O protruding from the rear side (see FIG. 5) of the wheel C comes into contact with mechanical membrs which flatten it down onto the rear end of the packet G'.

This is done by a pair of loose pins 262 at the lateral rear aperture in each compartment T', pivoted to an extremity of a radial rod 263 secured to the rear side of the wheel C.

Once the packet G', around which the cutting S' is partially wrapped, has reached the bottom of the compartment T', the pusher 243 is free to commence its return travel towards the wheel B.

When the batch under consideration pauses in the position C', the folding takes place of the panel Q lying on a radial plane and protruding past the lower corner of the compartment T'.

This is attended to by the previously mentioned folder 256 and with the interposition of a reciprocating blade member 264 between it and the packet G'.

The blade member 264 integral with the previously mentioned arm 258 and positioned at a height on the compartment T' on a plane tangential with the wheel C, is carried so that it becomes attached to the side of the packet G' by means of a forward motion operated by the mechanical link described by the cam 100.

The function exercised by the blade member 264 is twofold: it prevents any displacement of the packet G' no longer locked in the compartment T' by the pusher 243 and, furthermore, acts as a rigid pressure support member while the panel Q is being folded, according to one of the characteristics of the machine.

The folder 256, fashioned in the form of a blade, is given a vertical reciprocating motion on a plane tangential with the cylindrical surface of the wheel C and it engages on edge with the panel Q folding it on to the blade member 264. The folder 256 is fixed to a rod 265 connected by means of a link 266 to a lever 267 integral with one extremity of a shaft 268, the other extremity of which is, in turn, secured to a lever 269. Lever 269 is fitted with a loose pin which slides in the race of the previously mentioned operating cam 89.

Once the last, mentioned folding operation has been brought to a conclusion, the blade member 264 is withdrawn from beneath the already folded panel Q and returned to its former position and, while the folder 256 reverses its travel direction, the wheel C resumes its unidirectional, intermittent rotation in a counter clockwise direction, thereby transferring the compartment T' under consideration towards a second position C''.

As the said transfer movement is commenced and prior to the folder 256 fully releasing the panel Q, a fixed folder 270 flattens the panel M on to the panel Q.

The folder 270 consists of a guide coaxial to the wheel C, enshrouding the cylindrical surface of the wheel up as far as a position for ejecting the packet G' partially wrapped in the cutting S'.

Between the entry and ejection positions of this pocket, a second circular rim fixed guide 271 delimitates the front aperture (see FIG. 5) of the compartment T' so as to prevent, in conjunction with the pins 262 acting on the rear aperture and with the fixed guide 270 delimitating the entry aperture of the compartment, any displacement of the packet G' or of the cutting S'.

Following the action of the fixed guide 270, the cutting S' takes on a tubular shape at a point corresponding to a previously glued area of the panels M and Q and, as a result of this, becomes attached to the four lateral sides of the packet G'.

Then the compartment T' under consideration arrives in the second position C'' placed a 45° with respect to the position C' following which, after a succession of rotary movements spaced with pauses in the positions $C^{III}$ and $C^{IV}$, it reaches a position $C^V$ placed a 180° from the entry position C', where the packet G' partially wrapped in the cutting S' is expelled.

This particular ejection operation and thus the transfer to a third wrapping wheel D is carried out, exactly as seen previously, by a pusher and counter pusher.

The pusher 272 is placed like the previously seen counter-pusher 244, by the wrapping head C, in horizontal alignment with the compartment T' under consideration which is at a standstill in the position $C^V$ and is provided with an outward and return straight-line reciprocating motion.

The pusher 272 is mounted on a horizontal rod 273 provided with a rack to mesh with a gearwheel 274 keyed on to one extremity of a horizontal shaft 275 inside the hollow shaft 93. The other extremity of the shaft 275 carries rigidly mounted on it a second gearwheel 276 which meshes with a sector gear on the end of one arm of a two armed lever 277 pivotal to the previously mentioned shaft 255.

The extremity of the other arm of the lever 277 has pivoted to it a loose pin that slides in the race of the operating cam 87.

The counter-pusher 278 positioned at a point corresponding to where the wrapping wheel D is located, is placed in horizontal alignment with the compartment T'' of the wheel D, when that wheel is at a standstill in a first position D', known as the entry position, in its intermittent unidirectional rotation. The counter-pusher 278 is given an outward and return reciprocating motion in a straight line. It is mounted on a horizontal shaft 279, the other extremity of which is provided with a rack to mesh with a gearwheel 280 rigidly mounted on one end of a horizontal shaft 281 which passes internally through the sleeve 112.

The other end of the said shaft 281 rigidly carries a gear 282 turned by the previously mentioned cam 120 through a block 28, which carries in rotation around. its axis the shaft 281, by means of a rack and is moved in a reciprocating fashion over a fixed horizontal track, not illustrated, by a guide with which the cam 120 is provided.

During its outward travel, the counter-pusher 278 approaches and presses against the panel M superposed over the panel Q, after which the packet G', partially wrapped in the cutting S', pushed by the pusher 272 and accompanied by the counter-pusher 278, is transferred into the inside of a compartment T'' at a standstill in the position D'. While this transfer is taking place, the tab M' superposed over the tab Q' is flattened on to the bottom of the packet G'. This operation is performed by a fixed folder 284 consisting of two loose pins mounted on the same vertical axis fixed to a fixed support and placed in the path of the said tab M'.

Like the wheel B, the wheel D rotates in a clockwise direction (see the arrow $f^{IV}$). However, it is provided with 24 radial compartments placed at 15° from one another. One after the other, these compartments pause in a position indicated D' in line with the path followed by the pusher 272. In this particular case there is no direct link between the wheel D and the Geneva mechanism 108, as has been the case hitherto and the connection is made through the gears 110 and 111, the latter having three times the number of teeth of the former.

This means that with each angular displacement of the gear 111, integral with the wheel D, corresponding to one step of the Geneva mechanism 108 with eight spaces, the wheel D, instead of turning by 45° as seen for the wheels B and C, only moves 15°, that is to say, the angle between two successive compartments therein.

Each compartment T'' of the wheel D is provided with a blade member 285, rectangular in shape, which extends radially to delimit the rear aperture (see FIG. 5). By rotating around their pivot 286, blade members 285 are able to assume a diverging and a slightly converging position with respect to the inside of the compartment T''.

This is achieved by means of a fixed cam coaxial with the wheel D and not shown in FIG. 5, over whose profile the pins 287 integral with each of the blade members 285 run each time the said wheel moves.

The conformation of this cam is such that the blade member 285 of the compartment T'' destined to receive the packet G' partially wrapped in the cutting S' in the position D' is made to adopt a diverging position in order to facilitate the insertion operation that the compartment.

At this juncture, while the pusher 272 commences its return travel inside the wheel C, the wheel D moves towards a second position D''.

During this movement, the blade member 285 moved by the previously mentioned fixed cam approaches and presses against the end of the packet G' on which the tabs O' have been folded and the tabs M' and Q' superposed.

Starting from the first position D', the wheel D is then delimited by two fixed guides which extend up as far as the position where the finished packets are expelled and, more precisely, by a circular rim guide 288 which delimitates the forward apertures of the compartments T'' and by a second guide 289 coaxial with the wheel D which delimitates its cylindrical surface.

Reverting back now to the compartment T'' to which consideration has been given up until this time, after a series of displacements punctuated by stops, it reaches a position indicated $D^{IV}$ where the folding of the tab P', at the rear insofar as the movement direction of the wheel D is concerned and lying on a plane radial thereto, is performed by a folder 290. The folder 290 is fashioned in the form of a spade and it oscillates over a path tangential with the rear plane of the wheel D so as to engage on edge with the tab P' and to flatten it against the blade member 285 which, on this particular occasion, acts as a buffer member to protect the packet G'.

When the intermittent unidirectional rotation of wheel D is resumed and during the transfer of the compartment T'' under consideration towards its subsequent position, the folding takes place of the tab N' which is at the front in the direction in which the wheel D moves and lies on a plane radial thereto.

This operation is performed by the radial entry edge of a circular rim fixed guide 291 which flattens the tab N' on to the tab Q' before the spade shaped folder 290 is fully withdrawn. In this case too, the blade member 285 acts as a rigid buffer member to guarantee the operation being completely successful.

The guide 291 is followed without interruptions by a second guide 292 whose behaviour is identical and which delimitates the rear apertures of the compartments T'' up as far as the ejection position.

The guide 292 is provided with a movement which allows it to approach or move away from the wheel D and it is heated by means of resistances, not shown in FIG. 5, the purpose of this being to dry the glue on the tabs P' and N' superposed to form the bottom of the finished packet, henceforth referred to as the packet G''.

The reciprocating movement of the guide 292 is derived through a rod 293, the other extremity of which is pivoted to the connecting rod 119 mounted eccentrically on the previously mentioned shaft 118.

The rhythmic pressure applied by the guide 292 is offset by the blade member 285 which constitutes a rigid support member for the parts of the outer wrap exposed thereto and guarantees the operation being accomplished perfectly.

The batch G of cigarettes wrapped in its inner wrap S of foil and in its outer wrap S' after a number of rotary movements with wheel D, interrupted by pauses and still subjected to the intermittent action of the circular rim guide 292 then arrives at a station $D^n$ placed at 270° with respect to the station D' where it is placed in alignment with a lifting-ejecting member 294 provided with a reciprocating motion over a path radial to the wrapping wheel D. The lifting-ejecting member 294 is mounted on a vertical rod 295 on the opposite end of which a rack is provided to mesh with the gearwheel 280 to which prior reference has been made in respect of the counter-pusher 278, the drive for which is derived from the cam 120.

During the pause of the compartment T'' under consideration in this latest position $D^n$ and while moving upwards, the lifting-ejecting member 294 withdraws the packet G'' from the blade member 285, expels it and transfers it to inside a block 296 dimensioned in such a way as to hold and retain the packet G'' at the level of a horizontal pusher 297 provided with an outward and return reciprocating motion derived from the cam 124.

As it moves along, the pusher 297 engages with the bottom of the packet G'', which is thus ejected from the block 296 and is pushed in the direction of its major dimension, on to a plate 298 which, together with two lateral walls, first fixed and then moving, constitute the station E or the exiting channel for the machine, as also described in U.S. patent application Ser. No. 423,180 filed Dec. 10, 1973 by the same applicant as herein.

While this transfer operation is proceeding, a sealing or revenue label S'' is placed transversely on the front end of the packet G'' in the direction in which the packet is being moved.

The revenue labels S'' are supplied by a fork 299 provided with an oscillating movement to which they are supplied in a known way from a pile or from a reel after various transfer operations controlled by the gear 129 through a chain 300 have been carried out and they have first been glued.

The fork 299 fitted with two parallel hollow prongs is mounted on one end of a hollow shaft 301, the other extremity of which is provided with a sector gear 302 which meshes with a sector gear carried on the end of one arm of a two armed lever 303 pivoted on to a fixed support. The other arm of the said lever 303 carries a loose pin which slides in the race of the operating cam 125 keyed on to the shaft 123.

The fork 299 which is connected through the hollow shaft 301 and a valve 304 operated by the cam 126 to a source of suction not illustrated in FIG. 5, is able to hold the revenue label S'' in a position crosswise with respect to its two prongs and to carry it along the path of the packet G'' by means of the described mechanical connection.

When the packet G'' arrives between the two prongs of the fork 299, now in a vertical position, the source of suction above the hollow shaft 301 ceases as the cam 126 closes the valve 304.

Now that the revenue label S'' is no longer held by the fork 299, it is dragged away by the packet G'' and since it has been pre-glued, it attaches itself transversely to the front end which has not been covered by the label S', while its two ends flatten on to the two opposite panels N and P of the packet G''.

With this sealing operation, the formation of the packet G'' around the batch G of cigarettes is thus completed.

When the pusher 297 has reached its travel limit, the packet G'' is positioned on the plate 298 in line with a pusher 305 provided with a reciprocating movement in a direction perpendicular to that of the pusher 297 and thus to the major dimension of the packets G''.

This latter pusher 305 is mounted on two horizontal rods 306 connected through a common link 307 to a lever 308 pivoted to one extremity of a shaft 309. The other extremity of the shaft 309 is integral with a lever 310 which carries on its free end a loose pin that slides in the race in the operating cam 127.

With each delivery of the pusher 305, the packet G'' under consideration and all the other packets that preceded it in the station E are sent forward along the exit channel a precise distance that allows, in the next cycle, a fresh packet G'' delivered by the pusher 297 to enter.

Under normal operating conditions of the machine as described, the packet G'' to which consideration has been given in respect of the various wrapping operations joins a row of packets in close contact one with the other along the entire path followed by the exit channel which is delimited on both sides, firstly by the fixed walls 311 and 311' and then by the moveable belts 312 and 312' whose task it is to move the packets towards the exit on the machine.

The belts 312 and 312' interspaced at a distance equal to the greater dimension of the packet G'', are given a synchronous intermittent forward motion timed to suit the reciprocating movement of the pusher 305.

Idle rollers 313 keep the belts 312 and 312' under tension. The ducts are moved by drive rollers 314 and 314' integral with vertical shafts 315 and 315', the lower extremity of which is provided with a gear 316 and 316', respectively, interconnected by means of idle gears 317 and 318.

The drive is passed on to the rollers 314 and 314' through a non-return device 319 mounted on the shaft 315' and connected to a connecting rod 302 pivoted to one end of a lever 321 pivoted to a fixed support. At an intermediate point the lever 321 carries a loose pin, not visible in FIG. 2, and this slides in the race of a cam 322 keyed to a shaft 323.

The said 323 is connected through a rod with a double articulation 324 to a second shaft 325 which carries rigidly mounted on its free end a gear 326 which takes its rotatory movement from the previously mentioned gear 128.

The aforementioned non-return device 319 takes its motion from the cam 322 and passes it on to the shaft 315' in such a way as to cause it to rotate intermittently always in the same direction, that is to say in the direction in which the belts 312 and 312' move since the stress of the connecting rod 320 in the opposite direction is absorbed by the non-return device 319 which, in this particular case, behaves as a loose wheel.

The amount the belts 312 and 312' move forward at each step is set exactly to allow, each time the pusher 305 delivers a packet G'', this to be accepted between them in such a way as to form, as previously stated, an unbroken sequence of packets arranged tightly one next to the other.

In order to prevent rebound from occurring when the pusher 305 is withdrawn and thus the last packet G'' in the row to be seated awry, a blade member 327 which serves as a stop is inserted between the pusher which has reached its travel limit and the packet in question.

The blade member 327, the task of which is to maintain the last packet in the row in its correct position once the pusher 305 has been withdrawn, is provided with an oscillating movement on a plane perpendicular to the direction in which the packets are carried forward.

The blade member 327 is integral with one end of a horizontal shaft 328 constituting its axis of rotation, the other end being integral with a lever 329 fitted with a loose pin which slides in the race of the previously mentioned cam 130.

A plate 330 is provided above the exit channel in the form of a cover and this is pressed against the sides of the packets by springs 331 secured to a support 332.

The plate 330 is, furthermore, provided with an oscillating movement to suit the intermittent forward motion of the belts 312 and 312' and this is derived in the following way from the cam 130.

The plate 330 is integral through its support 332 with a shaft 333 which constitutes its axis of rotation. One extremity of shaft 333 has fixed to it a lever 334 connected through a connecting rod 335 to one arm of a two armed lever 336, the second arm of which carries a loose pin, not visible in FIGS. 2a or 4, which slides in the race in the cam 130.

As a consequence of this movement, the plate 330 is made to press more tightly, during the periods of immobility of the belts 312 and 312', against the upper sides of the packets so that the lower sides are compressed against the base plate in the exit channel.

This compression, together with the fact that the plate 298 is heated in its intermediate area by resistances not visible in FIG. 5, accelerates the drying process for the glue on the lower side of the packet G'' where, as previously stated, the panel N was superposed over the panel Q.

The support 332 is provided with a handle 337 with which to manually move away the plate 330 from its closed position, should it be necessary to do so.

The glue drying operation initiated in the wheel D by the circular rim guide 292 is thus brought to an end in the way seen.

At the extreme far end of the said exit channel a disc 338 is provided (for example, of the type seen in the U.S. patent application Ser. No. 423,180) unidirectionally rotatable in the direction of the arrow $f^{vi}$ on a plane perpendicular to the direction in which the belts 312 and 312' move forward and on the side delimitating the exit channel, this disc is provided with two diametrically opposed teeth 339.

The disc 338 is integral with a shaft 340 on which a sprocket wheel 341 is carried and this takes its rotation through a chain 342 from a gear 343 rigidly mounted on the previously mentioned shaft 323.

The peripheric speed of the disc is such that each time a new packet is placed on the exit channel, the first packet G'' in the row is expelled from the packeting machine by a tooth 339 which, in its circular path, engages with the bottom of the packet.

What is claimed is:

1. A transmission system for a wrapping machine comprising;
    a system of mutually parallel drive shafts;
    a train of gears, each gear being mounted on a respective drive shaft and meshing with another of said gears to drive it;
    a motor disposed continuously to rotate one of said drive shafts and by said meshing gears continuously to rotate the other drive shafts;
    a system of first driven shafts parallel to said drive shafts;
    a system of wrapping wheels, each on one of said first driven shafts, said system of wrapping wheels defining an undulating path for articles to be wrapped, arcuately about successive wrapping wheels;
    a system of Geneva wheels, one mounted on each of said first driven shafts to intermittently, unidirectionally, rotatingly drive that shaft and thereby the respective wrapping wheel;
    a system of second driven shafts parallel said drive shafts;
    rotary cam means mounted on each of said second drive shafts; and
    reciprocatory means driven by said cam means in intermittent to-and-fro movements for performing wrapping operations on articles carried by said wrapping wheels and for transferring such articles to and from such wrapping wheels.

2. A transmission system according to claim 1 including an additional driven shaft to drive a conveyor to convey articles to be wrapped, relative to one of said wrapping wheels; and a Geneva wheel mounted on the additional driven shaft to intermittently drive the conveyor.

3. A transmission system according to claim 1 in which the reciprocatory means comprises rod means mounted for movement axially thereof for transferring articles to and from one of the wrapping wheels.

4. A transmission system according to claim 3 in which the reciprocatory rod means include pusher rod means and counterpusher rod means for respectively pushing batches of cigarettes relative to the respective wrapping wheel, and backing up the batches of cigarettes during such pushing.

5. A transmission system according to claim 1 for high-speed cigarette wrapping machine, in which the reciprocatory means comprises rod means disposed to reciprocate for cooperating with the wrapping wheels in wrapping batches of cigarettes by folding sheet material about said batches.

* * * * *